March 23, 1948.  W. O. KEELING  2,438,368
METHOD OF PURIFYING BENZENE
Filed April 9, 1945
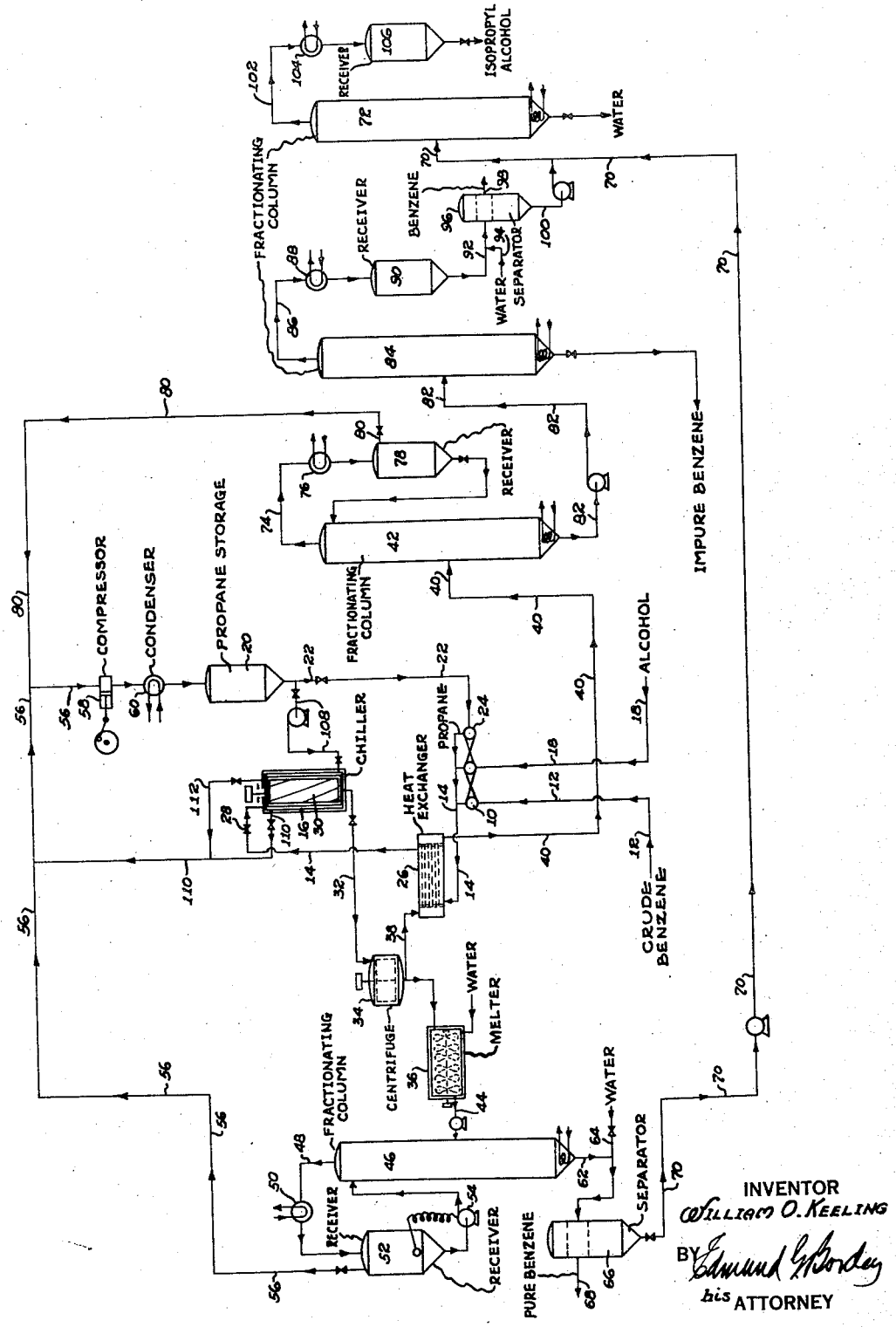
INVENTOR
WILLIAM O. KEELING
BY
his ATTORNEY Patented Mar. 23, 1948

2,438,368

UNITED STATES PATENT OFFICE 2,438,368

METHOD OF PURIFYING BENZENE

William O. Keeling, Pittsburgh, Pa., assignor to Koppers Company, Inc., Pittsburgh, Pa., a corporation of Delaware Application April 9, 1945, Serial No. 587,254

7 Claims. (Cl. 260—674)

The present invention relates to a process for recovering benzene of a high degree of purity from admixtures with other miscible hydrocarbons, and especially pertains to an improved method for separating benzene from therewith miscible hydrocarbons having boiling temperatures close to that of pure benzene.

The bulk of the benzene now produced in this country has its source in coke-oven light oil. Benzene so produced may be associated with other compounds, such, for example, as those familiarly known as the aromatics, unsaturated, paraffins, naphthenes and sulphur compounds. The separation of benzene from these compounds is normally carried out by chemical treatment and distillation. Often such methods fail to yield a benzene sufficiently free of these associated compounds to make it desirable for certain uses, such, for example, as nitration or chlorination. The present invention is particularly applicable for the separation of benzene of a high degree of purity from mixtures containing varying proportions of the above-mentioned materials and especially from such paraffinic and cyclic hydrocarbons as n-pentane, cyclopentane and the corresponding hexanes, heptanes, and the like, having physical characteristics which make them difficult of separation with the equipment generally used in the art. These compounds may be present to the extent of about two to three percent, their concentration depending on various factors, some of which are the type of coal carbonized, coking time and absorbent oil employed. Not only is the present improvement of great utility in the refinement of benzene obtained from coke-oven light oil, but it is also of advantage in the refinement of benzene derived from petroleum, water gas tar, drip oils or from special synthesis.

A primary object of the present invention is to provide a simple and effective method whereby benzene of a high degree of purity can be continuously separated from other hydrocarbons with which it is admixed in consequence of its method of formation or of its recovery.

A further object of the present invention is to provide a simple and effective method whereby benzene of a high degree of purity can be continuously separated from admixture thereof with associated hydrocarbons or other compounds having boiling points that are either higher or lower than that of pure benzene and particularly from paraffinic or other compounds having boiling temperatures close to that of pure benzene or which may form azeotropic mixtures therewith.

A further object of the present invention is to provide a simple and effective method whereby benzene of a high degree of purity can be continuously separated from admixtures with associated hydrocarbons by crystallization and azeotropic distillation.

A further object of the present invention is to provide a simple and effective method whereby a liquid miscible with benzene is used as a diluent and as a carrying agent for the benzene crystals formed when impure benzene is chilled and which also forms an azeotropic mixture with the benzene to permit the recovery of that portion of the benzene that is not separated by crystallization.

The invention has for further objects such other improvements and such other operative advantages or results as may be found to obtain in the method hereinafter described or claimed.

According to the present invention an impure benzene product is subjected to a crystallization step after there has been admixed therewith a preferred quantity of an extraneously derived and therewith miscible liquid which will not crystallize from the admixture within the temperature range employed in the step for crystallizing the benzene. The admixture is introduced into a chilling zone through which it is passed at a velocity adequate to crystallize benzene therefrom and to produce a flowable slurry, which comprises preferably a dispersion of very fine small, individual benzene crystals uniformly distributed throughout the carrier liquid, and which continuously passes therethrough, said velocity being always sufficient to retain the crystallized benzene in suspension in a mother liquor, thus keeping the walls of the chilling apparatus substantially free of benzene incrustations. Upon leaving the chilling zone the slurry is continuously passed through any preferred apparatus, such as a centrifuge, for separating the benzene crystals from residual mother liquor. After the separation the former are washed with either a fresh portion of the miscible liquid or, if preferred, by a small amount of pure benzene previously produced by the process, to remove therefrom residual mother liquor. This washing step, is carried out without substantial melting of the crystalline benzene and thereafter the purified crystals are continuously transferred to a melting chamber and liquefied by any preferred means, such as, indirect heat exchange with, for example, water.

Another important feature of this invention resides in the use of a solvent which forms an azeotrope mixture with the benzene that will pass through the chilling zone without crystallization of the benzene in the azeotrope and act as a carrier to make a flowable slurry of the benzene crystals that are formed. Aliphatic alcohols are good azeotrope solvents and isopropyl alcohol is particularly well adapted for this purpose. Only sufficient alcohol is used to form an azeotropic mixture with from 30% to 40% of the benzene to be purified. This azeotropic solution mixture is sufficient, however, to provide a good flowable crystalline slurry of the benzene that is crystallized because only that amount of the benzene is crystallized for which there is no isopropyl alcohol present to form the azeotropic mixture and said mixture does not crystallize at the temperature at which pure benzene crystallizes. The azeotropic mixture is separated from the crystalline benzene along with the mother liquor and a pure benzene may be recovered from the mother liquor by an azeotropic distillation and a water-separation of the benzene from the alcohol.

When isopropyl alcohol is used as an azeotrope solvent propane may be used as a solvent in combination with the alcohol. The propane acts as a carrier liquid and may be used as an internal chilling agent by evaporation. Only a slightly larger amount of propane is used in combination with the alcohol than is required to reduce the temperature of the mixture sufficiently to crystallize the pure benzene. Therefore the propane which may be entrained with the benzene or with the mother liquor may be effectively separated from the benzene and alcohol by distillation.

The invention further provides for the treatment of the separated mother liquor for the recovery of miscible liquid therefrom and also for its optional recovery from wash liquor residual in the melted benzene, the both of which can be returned thereafter to the process.

Liquid butane, liquid propane, the petroleum derivative commercially known as Stoddard solvent, and aliphatic alcohols can be used as the extraneously derived, miscible liquid for diluting the to-be-purified benzene product before it is passed to the chilling zone. These materials all have solidification points below that of benzene so that they do not crystallize therewith, and such of these materials as are entrained in the crystalline benzene can be easily removed in a washing step or by fractional distillation, the low boiling materials appearing in the first fraction whereas the Stoddard solvent is recovered as a distillation residue. The alcohols which form azeotropes with benzene can be recovered by simple water extraction of the melted benzene.

The accompanying drawing forms a part of this specification and shows for purpose of exemplification a preferred apparatus and method in which the invention may be embodied and practised but without limiting the claimed invention specifically to such illustrative instance or instances:

The illustrated apparatus will be described when the continuous process of invention is practised therein using propane in sufficient quantity to produce by evaporation the necessary cooling to form a slurry of benzene crystals by direct contact with the impure benzene with or without additional indirect chilling.

The benzene mixture to be purified enters one section of a proportioning pump 10 through a line 12 from a suitable storage tank (not shown) and is pumped through a line 14 to a chiller 16. At the same time isopropyl alcohol is introduced through a line 18 and is pumped under pressure into the line 14 to mix with the impure benzene being handled by pump 10. Simultaneously propane is drawn from a storage tank 20 through a line 22 to a third proportioning pump 24 and forced into the line 14 for mixture with the impure benzene and alcohol. The mixture flows through a heat interchanger 26 in passing through the line 14 into the chiller 16. As the mixture flows into the chiller the pressure is reduced through a valve 28 to permit the propane to be substantially all vaporized for the purpose of rapidly or shock chilling the mixture to cool it to a temperature sufficient to crystallize the free benzene in the mixture as separated fine-grained crystals. Preferably the mixture in the chiller 16 is rapidly stirred by a stirrer 30 to assist in obtaining the fine-grained crystals and for preventing the crystals from adhering to the walls of the chiller or building up in agglomerates.

Approximately 0.6 to 0.7 of a lb. of propane is used for each pound of impure benzene in the mixture in order to give sufficient refrigeration for crystallizing from 50% to 60% of the pure benzene in the mixture. Another 30% to 40% of the benzene in the mixture is dissolved in isopropyl alcohol to form an azeotropic mixture which does not crystallize at the temperature at which pure benzene crystallizes. About 10 to 13⅓% by volume of isopropyl alcohol to the volume of impure benzene is added to the impure benzene for the purpose of forming an azeotropic mixture at the time that the benzene with the isopropyl alcohol therein is distilled. The alcohol dissolved in the benzene forms a solution which acts as a carrier liquid for holding the crystallized benzene in a readily flowable slurry and the propane also assists in making the slurry, although preferably the greater part of the propane is vaporized in refrigeration. The refrigeration or chilling of the mixture is preferably carried out to reduce the mixture to a temperature of approximately zero degrees Fahrenheit in providing a crystalline separation of 50% to 60% of the benzene. If more than 50% to 60% of the benzene is to be recovered by crystallization, then a proportionately larger amount of propane must be supplied to the mixture and a smaller amount of alcohol must be supplied to the mixture in order to provide a larger amount of pure benzene for crystallization.

The benzene-solvent slurry mixture continuously flows from the chiller through a line 32 into a continuous centrifuge separator 34. In the centrifuge the crystalline mass is preferably washed with pure benzene to separate mother liquor, the crystalline benzene being passed to a melter 36 and the mother liquor being removed from the centrifuge through a line 38. The mother liquor passes through the heat interchanger 26 for the purpose of cooling the pure benzene solvent mixture and then flows through the line 40 into a stripping column 42. In the melter 36 the benzene is preferably melted by hot water and then flows through a line 44 into a fractionating column 46. A fractionation is carried out in the column 46 by which some benzene, together with any propane in the mixture, passes overhead through a line 48 into a condenser 50. Practically all of the vapors, except the propane, passing through the condenser 50 are condensed and pass into a receiver 52. Benzene is then returned from the receiver 52 by means of a pump 54 to the top of the fractionating column for refluxing. The propane collected in the receiver 52 flows through a line 56 to a compressor 58 where it is compressed and passed through a condenser 60 and then flows into the propane storage tank 20.

From the bottom of the fractionating column 46 the benzene-alcohol mixture is drawn out through a line 62 and water is added to the mixture through a line 64. This diluted mixture then flows into a separator 66 where the benzene and dilute alcohol separate by stratification, the benzene being drawn off from the upper portion through line 68 and the dilute alcohol passing out of the bottom of the separator through a line 70. The dilute alcohol is pumped through the line 70 to an alcohol concentrating still 72.

The major portion of the benzene alcohol mixture flows out of the centrifuge along with the mother liquor. This mother liquor mixture is distilled in a column 42 to drive overhead a small amount of benzene, together with the propane through a line 74. The vapors passing through the line 74 flow through a condenser 76 where they are condensed and go into a receiver 78. The condensed benzene is returned from the bottom of the receiver to the upper portion of the still 42 to act as reflux and the propane from the receiver 78 flows through a line 80 to the compressor 58 to be liquefied and collected in the storage tank 20. From the bottom of stripping still 42 a mixture of mother liquor and the benzene-alcohol mixture flows through a line 82 into a fractionating still 84. In the fractionating still the benzene-alcohol azeotrope is passed overhead through a line 86 to a condenser 88 where it is condensed and flows into a receiver 90. From the receiver 90 the azeotropic mixture passes through a line 92 in which it is mixed with water introduced through a line 94 and flows into a separator 96. The dilution of the azeotrope mixture with water acts to break the azeotrope mixture so that the benzene and dilute alcohol separate. The benzene is drawn from the upper portion of the separator through a line 98 and the dilute alcohol is removed from the base of the separator through a line 100. The dilute alcohol from the separator 96 is joined with the dilute alcohol from the separator 66 and this mixture is distilled in the still 72 to separate the isopropyl alcohol from the water. The alcohol vapors pass overhead through a line 102 into a condenser 104 and are collected in a receiver 106 for reuse in the process.

With the method and apparatus outlined above a plurality of solvents may be used whereby a minimum amount of each of the solvents is employed in effecting the separation. The propane or other low boiling paraffin hydrocarbons do not form azeotropes with benzene but are very efficient as a liquid carrier to hold the fine-grained crystals of benzene in a flowable slurry. Furthermore by operating under pressure these paraffin hydrocarbons may be vaporized in the body of the benzene mixture to directly and rapidly chill the benzene liquor. The propane or butane may preferably be handled at a pressure of 100 to 300 lbs. and the pressure in the chiller is reduced to a sufficient degree of from 50 to 100 lbs. in order to effect the desired chilling. Preferably substantially all of the propane or butane is vaporized in order to avoid the necessity of carrying on a separate fractionation of the mixture to recover the low boiling hydrocarbon. If desired propane from the storage tank 20 may be conducted through a line 108 and passed through a jacket on the chiller to give external cooling for chilling the benzene mixture in the chiller. The expanded propane passing through the jacket of the chiller 16 leaves through a line 110 to pass to the line 56 by which the propane is returned to the compressor 58 to be liquefied and sent to the storage tank 20. When the pressure is reduced in the chiller 16 propane is vaporized and this propane vapor flows through a line 112 to the line 56 to be returned to the compressor 58.

The benzene-isopropyl alcohol azeotrope is composed of approximately two thirds benzene and one third isopropyl alcohol. It is desirable that only sufficient isopropyl alcohol be added to the benzene in order to make the amount of azeotrope which will effectively separate impurities from the benzene. In practice it is found to be preferable to remove the major portion of the benzene by crystallization and from 30% to 40% of the benzene by azetropic distillation and water separation. In the present invention the crude benzene is mixed with an azeotrope solvent and a refrigerant solvent simultaneously in order to hold to a minimum the amount of the solvents which are required for azeotropic distillation and for refrigeration. The presence of the alcohol-benzene mixture has the distinct advantage that it acts as a carrier liquid for holding slurry of the crystals to pass through the chiller and at the same time permits the use of only the minimum amount of internal cooling solvent that is required to give the desired refrigeration. If external refrigeration is used in the chiller this will assist in separating the maximum amount of paraffin hydrocarbon from the mixture in the chiller. The alcohol which is concentrated in the still 72 may be returned to the process in a cyclic operation. Furthermore the propane used in the circuit is used in a cyclic operation. Very small amounts of these solvents are lost in the present method.

Ammonia or other refrigerants may be employed for indirect chilling in the jacket of the chiller 16 if desired.

The present application is a continuation in part of my abandoned application Serial No. 373,291, filed January 6, 1941, for "Method of refining light oil products." The invention of this application differs from the invention defined and claimed in my application Serial No. 587,255, filed April 9, 1945, in that the azeotropic forming solvent and the crystallizing solvent are added to the impure benzene before any benzene is separated by crystallization. In the application Serial No. 587,255 a major portion of the benzene is separated by crystallization before an azeotropic forming solvent is added to recover the remaining benzene.

The preferred form of the invention having been thus described, what is claimed as new is:

1. A method of recovering benzene of a high degree of purity from impure benzene comprising: mixing under pressure impure benzene with a mixture of solvents comprising propane and isopropyl alcohol which forms an azeotropic mixture with the benzene, reducing the pressure of the mixture while thoroughly stirring the mixture to evaporate the propane and rapidly crystallize the benzene as fine-grained separate crystals, separating the crystallized benzene from the liquid mixture, melting the crystals and distilling the benzene to recover a pure benzene, distilling the liquid mixture separated from the crystals to recover pure benzene from the solvent-benzene azeotropic mixture.

2. A method of recovering benzene of a high degree of purity from impure benzene comprising: mixing under pressure impure benzene with a mixture of solvents comprising propane and isopropyl alcohol which forms an azeotropic mixture with the benzene that will not crystallize or solidify at the temperature at which pure benzene will crystallize, reducing the pressure of the mixture while thoroughly stirring it to evaporate propane and rapidly crystallize the benzene as fine-grained separated crystals, the azeotropic mixture acting as a solute to provide a slurry of the benzene crystals, separating benzene crystals from the slurry, melting the crystals and distilling the benzene to recover a pure benzene product, distilling the liquid of the slurry to recover by azeotropic distillation a pure benzene.

3. The method defined in claim 1 in which the volume of azeotropic solution added to the impure benzene will form an azeotropic mixture with from 30% to 50% by volume of the benzene.

4. The method defined in claim 1 in which the volume of chilling solvent is only slightly in excess of the volume required to rapidly chill the mixture by evaporation to a temperature that will crystallize substantially all of the benzene that is not taken up in the azeotropic mixture.

5. The method defined in claim 1 in which the solvents used in separating the benzene are recovered and reused in the method.

6. A method of recovering benzene of a high degree of purity from impure benzene comprising: mixing under pressure impure benzene with a mixture of solvents comprising propane and isopropyl alcohol, reducing the pressure of the mixture while thoroughly stirring it to evaporate the propane and rapidly chill the benzene to a temperature at which the benzene in the mixture not included in the azeotropic mixture will crystallize as fine-grained separate crystals, separating the crystals from the mother liquor by centrifugal force, melting the crystals and distilling the benzene to recover a pure benzene, distilling the mother liquor to separate the isopropyl alcohol-benzene azeotrope, distilling the azeotrope after dilution with water to recover benzene and a water solution of isopropyl alcohol, concentrating the alcohol solution to obtain a substantially dry alcohol, and reusing the alcohol in the method defined.

7. The method defined in claim 1 in which all of the steps are carried out continuously to obtain a continuous recovery of pure benzene.

WILLIAM O. KEELING.

REFERENCES CITED

The following references are of record in the file of this patent:

UNITED STATES PATENTS

| Number | Name | Date |
|---|---|---|
| 1,677,551 | Delas | July 17, 1928 |
| 1,940,065 | Spannagel | Dec. 19, 1933 |
| 1,991,844 | Campbell et al. | Feb. 19, 1935 |
| 2,218,511 | Atwell | Oct. 22, 1940 |
| 2,313,538 | Greenburg | Mar. 9, 1943 |
| 2,356,240 | Hamlin | Aug. 22, 1944 |
| 2,360,655 | Deanesly | Oct. 17, 1944 |